Patented Apr. 28, 1936

2,039,111

UNITED STATES PATENT OFFICE 2,039,111

LUBRICATING OIL

Ernest F. Pevere, Beacon, N. Y., assignor to The Texas Company, New York, N. Y., a corporation of Delaware No Drawing. Application April 23, 1934, Serial No. 721,972

5 Claims. (Cl. 87—9)

This invention relates to the manufacture of lubricating oil characterized by a low pour test, and to novel pour point depressants and to methods of producing the same.

The invention contemplates the preparation of mineral lubricating oil having a reduced pour test and other desired qualities from lubricating oil stock, such as those derived from mixed base and paraffin base crudes and the like, by the addition to the lubricating oil of a pour point depressant material or wax crystal inhibitor. The invention particularly contemplates the addition to a lubricating oil of a glycol di-ester of a higher saturated fatty acid, such as ethylene glycol di-stearate.

Lubricating oil stocks derived from paraffin and mixed base crudes contain appreciable amounts of wax and, therefore, have a relatively high pour test unless a substantial amount of this wax is removed. The removal of this wax is usually accomplished by cold settling, filtration or centrifuging. However, lubricating oil stock, after dewaxing by these processes, may still retain some wax, and may have a pour test above 15° F. and up to about 40° F. The removal of further quantities of wax from these stocks in order to further reduce the pour test necessitates expensive further processing.

On the other hand, the presence of a certain amount of wax in a lubricating oil may be beneficial from the standpoint of providing a comparatively flat temperature-viscosity curve. That is, there is a relatively small change in the viscosity of the oil between temperatures of say 100° F. and 210° F. Consequently, it is of advantage to add to the oil a material which will have the effect of reducing the pour test or cold test to the desired extent without the necessity of entirely removing the remaining wax.

I have discovered that a glycol di-ester of a higher saturated fatty acid, such as ethylene glycol di-stearate or ethylene glycol di-palmitate, constitutes a highly effective pour depressant material for purposes of the present invention. The ester may be prepared from chemically pure stearic acid; or commercial stearic acid; or other relatively impure stearic acid such as that recovered from soap plants, grease plants and the like, may be used. The glycol di-stearate may be prepared by reacting ethylene chloride with an alkali metal salt of the stearic acid according to the following equation:

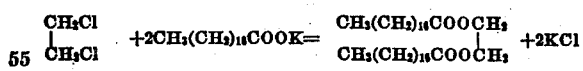

The ester is then separated from the reaction product. It may be further purified by dissolving in ether, washing the ethereal solution first with weak sodium hydroxide solution and then with distilled water, and finally evaporating the ether to obtain the ester as a white solid. Where free fatty acid is present in the ester, this may be removed by the above purification treatment.

The proportion in which the depressants of the present invention are added to a mineral lubricating oil is critical, in that increase in the proportion of a particular glycol ester up to a certain amount is found to provide increased lowering of the pour point of a particular oil; whereas, further increase in the proportion beyond that optimum amount gives no further beneficial effect, and in fact, may result in raising the pour point. Ordinarily, a proportion of glycol ester less than 1.00 g. per 100 cc. of the oil is employed; and as little as 0.10 g. per 100 cc. of oil gives pronounced pour point depressant effect. Optimum results with ethylene glycol di-stearate are secured by the addition of from ¼% to ½% by weight on the weight of the oil.

By way of example, the following results were obtained by the addition of the specified amounts of C. P. ethylene glycol di-stearate to 100 cc. of a paraffin base lubricating oil having a Saybolt viscosity at 100° F. of 300, a Saybolt viscosity at 210° F. of 50, and a normal pour point of +20° F.

| Grams ethylene glycol di-stearate per 100 cc. of oil | Pour point °F. |
|---|---|
| 0.06 | +15 |
| 0.10 | +10 |
| 0.125 | +5 |
| 0.15 | 0 |
| 0.18 | −5 |
| 0.25 | −10 |
| 0.375 | 0 |
| 0.50 | 0 |

The following results were obtained by the addition to the same lubricating oil of the specified amounts of ethylene glycol ester prepared from commercial stearic acid in the manner outlined above.

| Grams of the ester per 100 cc. of oil | Pour point °F. |
|---|---|
| 0.125 | +10 |
| 0.25 | −20 |
| 0.50 | −15 |
| 0.75 | 0 |

I am aware that it has been proposed to add in small proportion to mineral lubricating oils, such as motor oils, an ester selected from a large variety of synthetic organic esters, for the purpose of adding oiliness and increasing the bearing load capacity of the lubricants by reducing friction. My invention is distinguished from this suggestion by relating to the different function of reduction in pour point, which was not recognized or attained in the former suggestion, due to the use of different mineral lubricating oils of the naphthene base type or fully dewaxed type having initially low pour points, due to the use of a proportion range which lies substantially outside of the effective range of the present invention, and due to the use of a large variety of esters mainly of different classification, and of which substantially all are commercially ineffective for purposes of the present invention.

The depressants of the present invention are particularly valuable in that they are substantially colorless materials which do not objectionably affect the color of the oil, so that they are very suitable for addition to pale lubricating oils where deterioration in color would be objectionable. The desired lowering in pour point can also be obtained by the use of the materials of this invention without substantially altering other desirable properties of the oil. The oils of the present invention are very satisfactory for use as motor oils, such as in the crank case of an internal combustion engine. In the accompanying description and claims, where the expression "paraffin base lubricating oil" is used, it is to be understood that this means an oil of the mixed base or mid-continent type as well as oil of the paraffin base or Pennsylvania type, unless the contrary appears from the text.

Obviously many modifications and variations of the invention, as hereinbefore set forth, may be made without departing from the spirit and scope thereof, and therefore only such limitations should be imposed as are indicated in the appended claims.

I claim:

1. A lubricating oil having a pour point of substantially 5° F. or below, comprising a mixture of a partially dewaxed paraffin base lubricating oil normally having a pour point above 15° F., with a glycol di-ester of a higher saturated fatty acid in the proportion of from 0.10 g. to 1.00 g. of ester per 100 cc. of oil.

2. A lubricating oil having a pour point of substantially 5° F. or below, comprising a mixture of a partially dewaxed paraffin base lubricating oil normally having a pour point above 15° F., with ethylene glycol di-stearate in the proportion of from 0.10 g. to 1.00 g. of ester per 100 cc. of oil.

3. The method of preparing a lubricating oil of low pour point, which comprises reacting ethylene dichloride with an alkali metal salt of commercial stearic acid to produce ethylene glycol di-stearate, separating the di-stearate from the reaction product, and adding the di-stearate in a minor proportion to a partially dewaxed paraffin base mineral lubricating oil.

4. A lubricating oil adapted for use as a motor oil and having a pour point of substantially 5° F. or below, which consists essentially of a partially dewaxed paraffin base lubricating oil normally having a pour point above 15° F., and a glycol di-ester of a higher saturated fatty acid in the proportion of from 0.10 g. to 1.00 g. of ester per 100 cc. of oil.

5. A lubricating oil adapted for use as a motor oil and having a pour point of substantially 5° F. or below, which consists essentially of a partially dewaxed paraffin base lubricating oil normally having a pour point above 15° F., and ethylene glycol distearate prepared from commercial stearic acid in the proportion of from 0.10 g. to 1.0 g. of the ethylene glycol distearate per 100 cc. of oil.

ERNEST F. PEVERE.